(12) United States Patent
Ryan et al.

(10) Patent No.: US 7,766,347 B2
(45) Date of Patent: Aug. 3, 2010

(54) SEAT ASSEMBLY FOR A SHOPPING CART

(75) Inventors: Mark T. Ryan, Haskell, OK (US); Robert D. Peota, Minneapolis, MN (US)

(73) Assignee: Traget Brands, Inc., Minneapolis, MN (US)

(*) Notice: Subject to any disclaimer, the term of this patent is extended or adjusted under 35 U.S.C. 154(b) by 508 days.

(21) Appl. No.: 11/595,037

(22) Filed: Nov. 9, 2006

(65) Prior Publication Data

US 2008/0111328 A1    May 15, 2008

(51) Int. Cl.
*B62D 39/00* (2006.01)

(52) U.S. Cl. .............................. 280/33.993; 280/47.34; 280/33.99; 280/47.26; 280/30; 280/47.19

(58) Field of Classification Search ............ 280/33.993, 280/47.34, 33.99, 47.26, 30, 47.19
See application file for complete search history.

(56) References Cited

U.S. PATENT DOCUMENTS

| | | | |
|---|---|---|---|
| D156,701 S | 3/1948 | Conoklin |
| D156,702 S | 6/1948 | Conoklin |
| 2,479,530 A | 8/1949 | Watson |
| D155,971 S | 11/1949 | Concklin |
| D157,589 S | 3/1950 | Hartenbach |
| 2,527,953 A | 10/1950 | Muffley |
| 2,890,057 A | 6/1959 | Davis |

(Continued)

FOREIGN PATENT DOCUMENTS

EP    0161108    11/1985

(Continued)

OTHER PUBLICATIONS

US 5,201,134, Apr. 13, 1993, Rehrig et al. (withdrawn).

(Continued)

*Primary Examiner*—Christopher P Ellis
*Assistant Examiner*—Cynthia F Collado
(74) *Attorney, Agent, or Firm*—Faegre & Benson LLP (57) ABSTRACT

A gate-and-seat assembly for a shopping cart includes a gate, a backrest, and a seat. The gate has a first end pivotally mountable to a rear portion of a shopping cart. The backrest includes a back support and a pair of legs with the back support defining a slot. The pair of legs extends from the back support and is pivotally mounted to a lower portion of the gate to enable pivotal movement of the backrest relative to the gate. The seat is pivotally mounted to the gate via at least one pivot mechanism and slidably extends through the slot of the back support. The seat includes a pair of ears extending laterally outward from the seat in opposite directions with each respective ear being releasably engageable relative to a rear surface of the back support of the backrest. The entire gate-and-seat assembly is made entirely from a plastic material. The seat is pivotally movable from a seating position to a collapsed position upon pivotal movement of the backrest relative to and toward the gate wherein the seat slidably moves through the slot of the back support and pivots downward toward the gate until both the seat and the back support are collapsed against the gate with the back support being spaced vertically above the seat.

17 Claims, 7 Drawing Sheets

U.S. PATENT DOCUMENTS

| | | |
|---|---|---|
| 2,890,059 A | 6/1959 | Brooks et al. |
| 2,891,801 A | 6/1959 | Sides |
| 2,906,542 A | 9/1959 | Hoedinghaus et al. |
| 2,911,227 A | 11/1959 | Davis |
| D188,841 S | 9/1960 | Umanoff et al. |
| 2,952,470 A | 9/1960 | Lachance et al. |
| 2,958,536 A | 11/1960 | Young |
| 2,997,311 A | 8/1961 | Umanoff |
| 3,048,420 A | 8/1962 | Umanoff |
| 3,112,934 A | 12/1963 | Buczak |
| D198,448 S | 6/1964 | Moran |
| 3,195,912 A | 7/1965 | Howard et al. |
| 3,346,271 A | 10/1967 | Parsons |
| 3,614,133 A | 10/1971 | Ganci et al. |
| 3,645,554 A | 2/1972 | Von Stein et al. |
| 3,717,358 A | 2/1973 | Mills |
| D231,336 S | 4/1974 | Wahl |
| 3,829,114 A | 8/1974 | Cohen et al. |
| 3,931,984 A | 1/1976 | Young |
| 3,963,255 A | 6/1976 | Trubiano |
| 3,999,774 A | 12/1976 | Rehrig |
| 4,046,394 A | 9/1977 | Thompson, Jr. |
| 4,065,142 A | 12/1977 | Rehrig |
| D247,953 S | 5/1978 | Rehrig |
| 4,123,077 A | 10/1978 | Joseph |
| 4,125,270 A | 11/1978 | Trubiano |
| 4,268,049 A | 5/1981 | Salvador |
| 4,273,346 A | 6/1981 | Rehrig |
| 4,423,882 A | 1/1984 | Stover et al. |
| D277,532 S | 2/1985 | Duhamel |
| 4,537,413 A | 8/1985 | Rehrig |
| 4,555,123 A | 11/1985 | Rehrig |
| D283,264 S | 4/1986 | Levy-Joseph |
| 4,632,411 A | 12/1986 | Badger |
| 4,650,199 A | 3/1987 | Rehrig |
| D294,419 S | 2/1988 | Rehrig |
| 4,746,134 A | 5/1988 | Rehrig |
| D296,259 S | 6/1988 | Rehrig |
| 4,865,338 A | 9/1989 | Rehrig |
| 4,922,639 A | 5/1990 | Rehrig |
| 4,930,795 A | 6/1990 | Tannehill et al. |
| D311,983 S | 11/1990 | Rehrig |
| D314,269 S | 1/1991 | Trubiano |
| D317,219 S | 5/1991 | Rehrig |
| 5,111,604 A | 5/1992 | Rehrig |
| 5,203,578 A | 4/1993 | Davidson et al. |
| 5,210,968 A | 5/1993 | Rehrig |
| 5,225,141 A | 7/1993 | Hendry |
| 5,238,256 A | 8/1993 | Ondrasik |
| 5,289,936 A | 3/1994 | Jones et al. |
| 5,331,756 A | 7/1994 | Rehrig |
| 5,362,077 A | 11/1994 | Adamson |
| 5,368,318 A | 11/1994 | Rehrig et al. |
| D359,828 S | 6/1995 | Lindberg |
| 5,441,288 A | 8/1995 | Rehrig |
| 5,458,347 A | 10/1995 | Chiv |
| 5,494,306 A | 2/1996 | Adamson et al. |
| 5,553,877 A | 9/1996 | Huang |
| D377,255 S | 1/1997 | Rehrig |
| 5,595,394 A | 1/1997 | Adamson |
| 5,613,696 A | 3/1997 | de Luna |
| 5,630,599 A | 5/1997 | Adamson et al. |
| D379,834 S | 6/1997 | Huang |
| 5,791,666 A | 8/1998 | Mainard |
| D400,679 S | 11/1998 | Kern et al. |
| 5,865,448 A | 2/1999 | Kern et al. |
| 5,871,286 A | 2/1999 | Kern et al. |
| D411,264 S | 6/1999 | Huang |
| 5,915,704 A | 6/1999 | Segura de Luna |
| 5,947,313 A | 9/1999 | Kern et al. |
| 5,961,133 A | 10/1999 | Perry |
| 6,029,380 A | 2/2000 | Goddard |
| D426,365 S | 6/2000 | Rehrig et al. |
| 6,098,998 A | 8/2000 | Ondrasik |
| 6,155,580 A * | 12/2000 | Symons ............... 280/33.991 |
| 6,186,382 B1 | 2/2001 | Bergin et al. |
| D443,231 S | 6/2001 | Chen |
| D443,968 S | 6/2001 | Porter |
| D445,230 S | 7/2001 | Deal et al. |
| D445,231 S | 7/2001 | Porter |
| 6,270,093 B1 | 8/2001 | Johnson et al. |
| 6,336,249 B1 | 1/2002 | Plumley |
| D463,647 S | 9/2002 | Deal et al. |
| 6,497,423 B1 * | 12/2002 | Perelli et al. ............ 280/47.34 |
| D468,880 S | 1/2003 | Porter |
| D470,292 S | 2/2003 | Johnson et al. |
| 6,540,240 B2 * | 4/2003 | Nadeau et al. ......... 280/33.993 |
| 6,572,122 B2 | 6/2003 | Johnson et al. |
| 6,589,458 B2 | 7/2003 | DeCost |
| 6,644,524 B1 | 11/2003 | Garvin |
| 6,669,212 B2 | 12/2003 | Porter |
| 6,705,623 B2 * | 3/2004 | Nadeau et al. ......... 280/33.991 |
| 6,736,415 B1 | 5/2004 | Lenihan |
| 6,749,204 B2 | 6/2004 | Werner |
| 6,761,364 B2 | 7/2004 | Murar et al. |
| 6,805,365 B2 | 10/2004 | Lantz |
| 6,832,768 B2 | 12/2004 | Duchene et al. |
| 6,926,291 B1 | 8/2005 | Ondrasik |
| 6,966,566 B2 | 11/2005 | Duchene et al. |
| 6,981,708 B1 | 1/2006 | Tucker et al. |
| 6,983,944 B2 | 1/2006 | Bergia |
| 7,063,337 B2 | 6/2006 | Russell et al. |
| D530,478 S | 10/2006 | Splain et al. |
| D536,874 S | 2/2007 | Splain et al. |
| D538,501 S | 3/2007 | Walter |
| D546,021 S | 7/2007 | Splain et al. |
| 7,237,782 B2 | 7/2007 | Tucker et al. |
| D550,423 S | 9/2007 | Splain et al. |
| D556,413 S | 11/2007 | Splain et al. |
| 2002/0135144 A1 * | 9/2002 | Murar et al. ........... 280/33.991 |
| 2003/0116933 A1 | 6/2003 | Nadeau et al. |
| 2003/0151217 A1 | 8/2003 | Trubiano |
| 2004/0046341 A1 | 3/2004 | Wilkinson |
| 2004/0104549 A1 | 6/2004 | Bergia |
| 2004/0239059 A1 | 12/2004 | Duchene et al. |
| 2005/0103797 A1 | 5/2005 | Rader et al. |

FOREIGN PATENT DOCUMENTS

| | | |
|---|---|---|
| EP | 0161890 | 11/1985 |
| WO | 9302903 | 2/1993 |
| WO | 9311018 | 6/1993 |
| WO | 9503201 | 2/1995 |
| WO | 95/26897 | 10/1995 |
| WO | 9604161 | 2/1996 |
| WO | 9730880 | 8/1997 |

OTHER PUBLICATIONS

U.S. Appl. No. 11/231,283, filed Sep. 19, 2005, and entitled "Cupholder for a Shopping Cart".

U.S. Appl. No. 11/231,307, filed Sep. 19, 2005, and entitled "Handbasket".

U.S. Appl. No. 11/231,313, filed Sep. 19, 2005, and entitled "Seat Assembly for a Shopping Cart".

U.S. Appl. No. 11/231,343, filed Sep. 19, 2005, and entitled "Shopping Cart Handle".

U.S. Appl. No. 11/231,344, filed Sep. 19, 2005, and entitled "Shopping Cart Base".

U.S. Appl. No. 11/231,364, filed Sep. 19, 2005, and entitled "Shopping Cart Basket".

Design U.S. Appl. No. 29/280,573, filed May 31, 2007, and entitled "Shopping Cart".

Design U.S. Appl. No. 29/296,975, filed Oct. 31, 2007, and entitled "Shopping Cart".

"Cart Manufacturer Unknown, photo taken by Attorney of Record Paul Grunzweig on Jan. 26, 2007 in Belgrade, Montana at Albertson's Grocery Store," 4 pages.

* cited by examiner

SEAT ASSEMBLY FOR A SHOPPING CART

BACKGROUND OF THE INVENTION

Shopping carts have become very important in Western culture. Stores around the world maintain fleets of shopping carts to facilitate a customer's selection, transport, and purchase of goods within those stores. Over many decades, the shape and size of shopping carts have changed to meet different models of shopping. However, in recent history, the basic shopping cart has changed very little, except for the application of different materials such as plastics.

Retailers devote considerable resources to shaping a customer's experience within a retail store to make shopping easier, more comfortable, and attractive. Unfortunately, very little of this attention has been placed on the shopping cart. Accordingly, shopping carts remain generally heavy, bulky, and difficult to maneuver. Conventional shopping carts are constructed to be rugged to withstand weather, misuse, and rough handling during use, collection and storage. Unfortunately, this attention to ruggedness has produced a cart with a steel chassis and handles, sometimes having rough edges and/or relatively sharp corners. These steel components contribute to the stodgy feel and unattractive appearance of many conventional shopping carts.

Given their high profile in the retail environment and their impact on the experience of the consumer, shopping carts should better serve to meet the needs and wants of consumers, especially in fast-moving, retail cultures.

SUMMARY OF THE INVENTION

Embodiments of the invention are directed to a gate-and-seat assembly for a shopping cart. In one embodiment, the gate-and-seat assembly for a shopping cart includes a gate, a backrest, and a seat. The gate has a first end pivotally mountable adjacent to a rear portion of a shopping cart. The backrest includes a back support and a pair of legs with the back support defining a slot. The pair of legs extends from the back support and is pivotally mounted to a lower portion of the gate to enable pivotal movement of the backrest relative to the gate. The seat is pivotally mounted to the gate via at least one pivot mechanism and slidably extends through the slot of the back support. The seat includes a pair of ears extending laterally outward from the seat in opposite directions with each respective ear being releasably engageable relative to a rear surface of the back support of the backrest. In one aspect, the entire gate-and-seat assembly is made entirely from a plastic material. In another aspect, the seat is pivotally movable from a seating position to a collapsed position, upon pivotal movement of the backrest relative to and toward the gate, wherein the seat slidably moves through the slot of the back support and pivots downward toward the gate until both the seat and the back support are collapsed against the gate with the back support being spaced vertically above the seat.

BRIEF DESCRIPTION OF THE DRAWINGS

Embodiments of the invention will be described with respect to the figures, in which like reference numerals denote like elements, and in which.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to a gate-and-seat assembly for a shopping cart. The shopping cart enables a consumer to shop for items within a store, placing those items in the shopping cart as the consumer moves through the store. In one embodiment, a gate-and-seat assembly includes a seat that is slidably movable through a slot in a back support of the gate-and-seat assembly so that upon a collapsing action of the back support toward and against the gate, the seat drops down through the slot to pivot downward toward the gate in an opposite direction from the back support until the seat rests against the gate in a position vertically below the back support in its collapsed position against the gate.

In one aspect, the "drop-down" function of the seat enables more effective nesting of multiple, similarly-equipped shopping carts (having substantially identical plastic seat assemblies) because the "drop-down" action of the seat minimizes the overall thickness of the gate-and-seat assembly in its collapsed position. In comparison, in a conventional seat assembly, the seat portion pivots upward during collapsing action of the back support so that the seat portion and the back support end up in a stacked relationship in the fully collapsed state of the conventional seat assembly. However, this conventional "pivot-up" seat is ineffective for an all-plastic gate-and-seat assembly because an all-plastic seat will have a thickness substantially greater (e.g., 2 to 4 times) than a conventional metal seat and an all-plastic back support will have a thickness substantially greater (e.g., 2 to 4 times) than a conventional metal back support. In particular, if stacked upon each other in a conventional "pivot-up" seat assembly, the combined thickness of the all-plastic seat and all-plastic back support would impede nesting of subsequent shopping carts. This situation would, in turn, impede collection, storage, and/or transportation of such conventional carts.

Fortunately, embodiments of the invention overcome this predicament during collapsing of the back support and seat against the gate by arranging the seat to drop down through a back support of the gate-and-seat assembly and away from the back support during pivotal movement of the back support against the gate. In one aspect, the overall thickness of the collapsed gate-and-seat assembly in this "drop-down" configuration is at least one-half of the overall thickness that would occur with the same all-plastic seat and all-plastic back support if arranged in a conventional "pivot-up" collapsing seat assembly. Accordingly, an all-plastic gate-and-seat assembly in embodiments of the invention facilitates nesting of large number of shopping carts.

These embodiments, and additional embodiments, are described in association with FIGS. 1-8.

Figure 1:
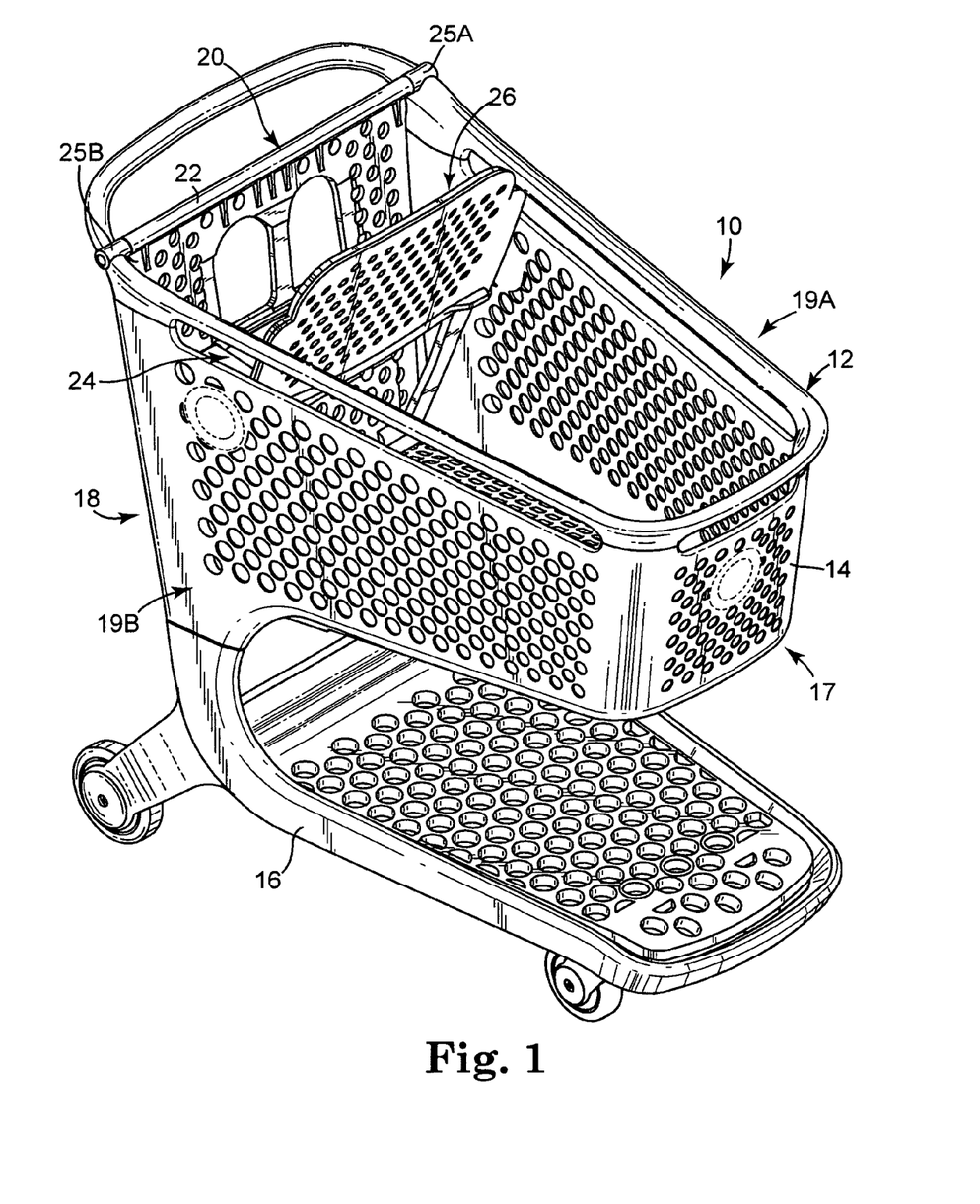
FIG. 1 is an isometric view of a shopping cart, according to an embodiment of the invention.

FIG. 1 is an isometric view of a shopping cart, according to one embodiment of the invention. As shown in FIG. 1, shopping cart 10 comprises handle 12, basket 14, and wheeled base 16. Handle 12 is mounted at an upper portion of basket 14. Basket 14 defines a container for carrying items and supports a gate-and-seat assembly 20, which includes gate 22, seat 24 and backrest 26. In one aspect, cart 10 comprises a front portion 17, rear portion 18, and side portions 19A, 19B.

Shopping cart 10 enables a consumer to move the cart through a store to place items in basket 14 for later purchase at a check-out counter of the store. Handle 12 facilitates maneuvering the cart 10 while gate-and-seat assembly 20 enables a child to travel in the cart 10 while shopping. In one aspect, the gate-and-seat assembly 20 is pivoted, via pivot mechanism 25A, 25B, upward within basket 14 to enable nesting multiple carts 10 together, as further illustrated in association with FIG. 8. In another aspect, seat 24 and backrest 26 are also collapsible against gate 22 adjacent a rear portion 18 of the basket 14 (as further described in association with FIGS. 2 and 5-6) to make more room for items in basket 14, or to facilitate nesting of multiple carts 10.

In one embodiment, each of handle 12, basket 14, and base 16, as well as gate-and-seat assembly 20 is made exclusively of a plastic material. This arrangement enables a lightweight cart while providing numerous structural, performance, and ergonomic functions. In another embodiment, one of handle, basket 14, or base 16, or additional components is made of a material other than a plastic material, such as metal or other materials. In one embodiment, gate-and-seat assembly 20, is made from a nylon material while in another embodiment, gate-and-seat assembly 20 is made from a high density polyethylene (HDPE) material.

Figure 2:
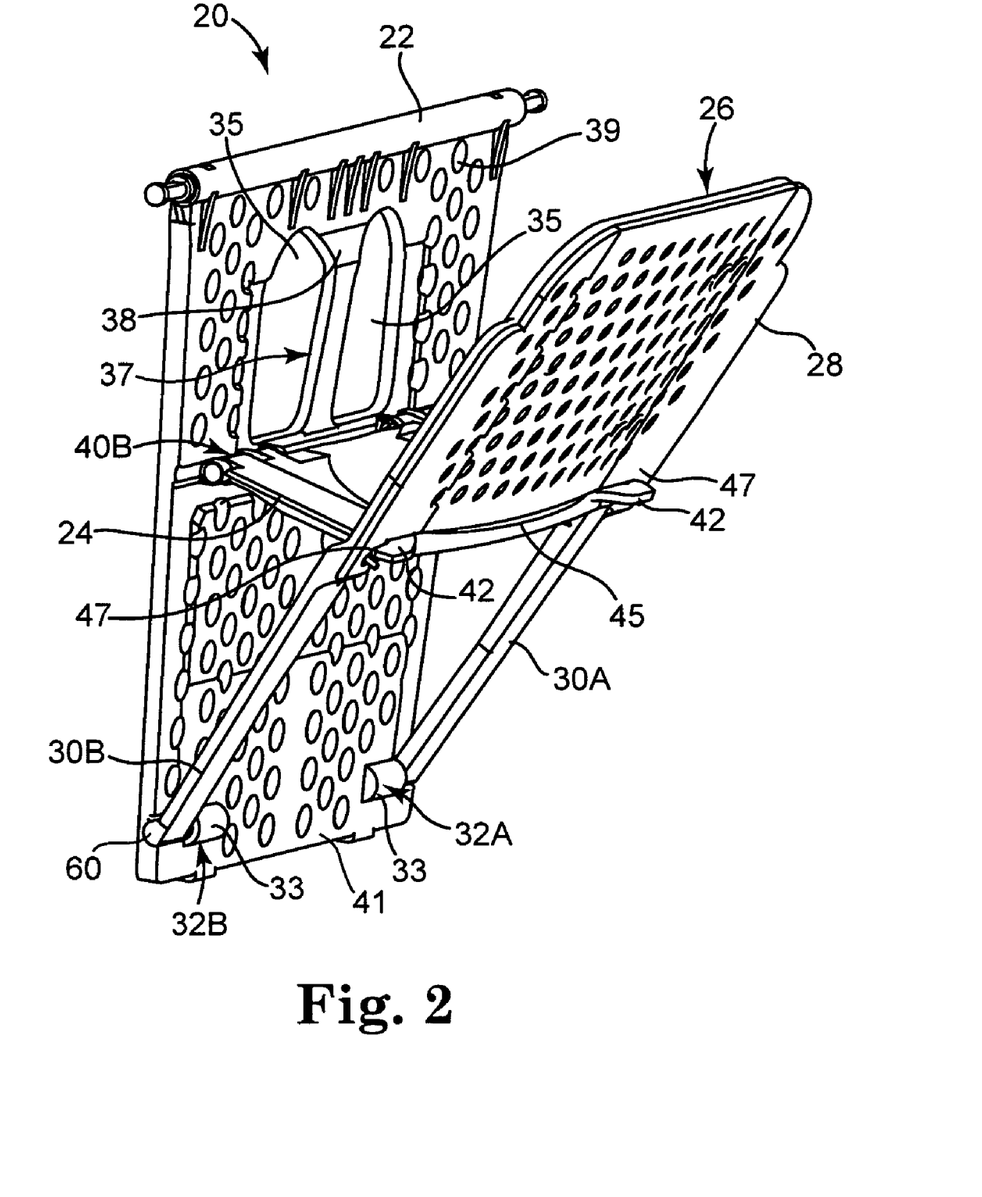
FIG. 2 is an isometric view of a gate-and-seat assembly, according to an embodiment of the invention.

FIG. 2 is an isometric view further illustrating gate-and-seat assembly 20, according to one embodiment of the invention. As shown in FIG. 2, in one embodiment, gate-and-seat assembly 20 comprises gate 22, seat 24 and back rest 26. In one embodiment, backrest 26 comprises back support 28 and legs 30A, 30B extending downward from back support 28. In one aspect, legs 30A, 30B are laterally spaced apart from each other on opposite sides of backrest 26. Backrest 26 also comprises slot 45 for slidably receiving seat 24, as further described in association with FIGS. 3-6, and comprises rear contact portion 47 on opposite sides of backrest 26 for releasable engagement with seat 24.

In another aspect, gate-and-seat assembly 20 comprises pivot mechanism 32A, 32B adjacent a lower portion 41 of gate 22 with each pivot mechanism 32A,32B including a sleeve 33 of gate 22 and pin 60 of each leg 32A,32B of backrest 26, as also further illustrated in association with FIGS. 3-6.

In another aspect, gate 22 of gate-and-seat assembly 20 comprises a pair of leg openings 35 separated by a divider 37 with divider 37 including an angled portion 38 adjacent an upper portion of divider 37. Angled portion 38 is sized and shaped to protrude inwardly toward basket 14 of shopping cart 10 to prevent a front portion of another shopping cart from damaging the divider 37 of gate 22 of cart 10 during nesting of the respective shopping carts.

Figure 3:
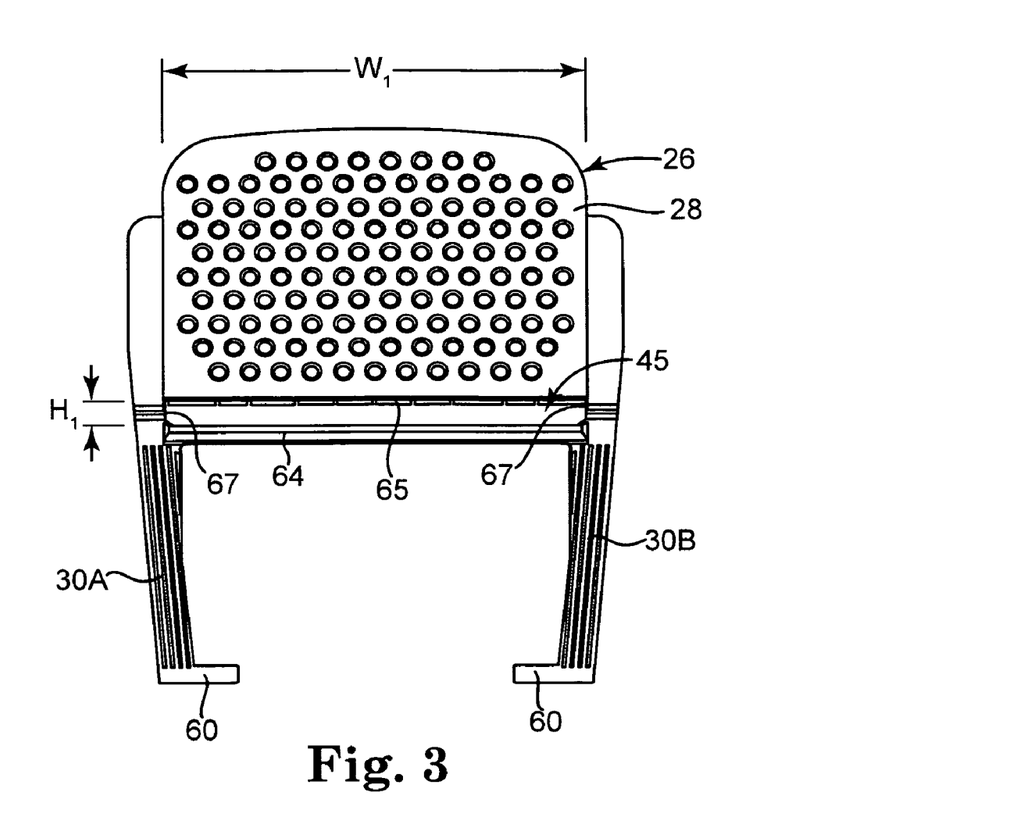
FIG. 3 is a front plan view of a backrest of the gate-and-seat assembly, according to an embodiment of the invention.

FIG. 3 is a front plan view of backrest 26, according to one embodiment of the invention. As shown in FIG. 3, in one embodiment backrest 26 includes back support 28 and legs 30A, 30B with each leg 30A, 30B also including a pin 60. In another aspect, backrest 26 comprises slot 45 defined by bar 64, lower edge 65 of back support 28 and side edges 67. Bar 64 extends laterally across backrest 26 between the opposite respective legs 30A, 30B. In one aspect, slot 45 has a height (H1) and a width (W1) that is sized and shaped to slidably receive seat 24, which is further illustrated in FIGS. 4-6.

Figure 4:
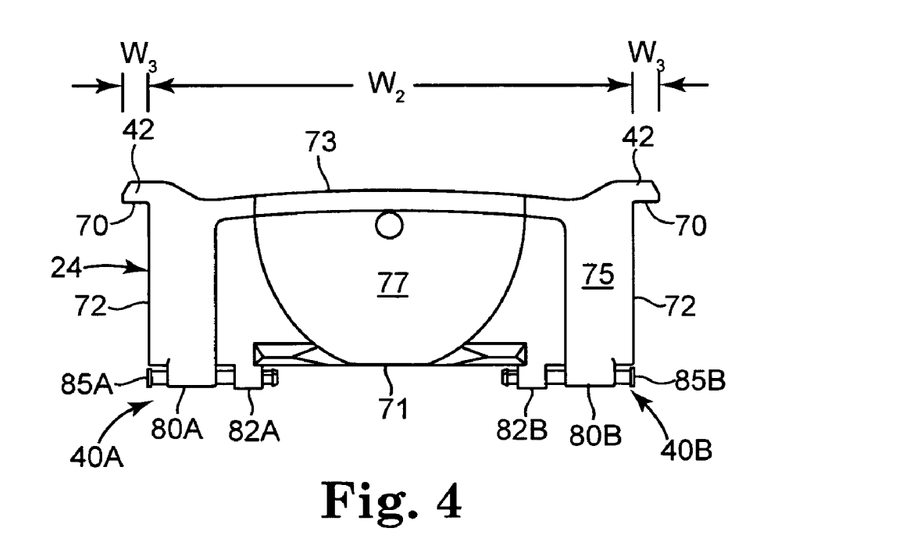
FIG. 4 is a top plan view of a seat of the gate-and-seat assembly, according to an embodiment of the invention.

FIG. 4 is a top plan view of a seat 24, according to one embodiment. As shown in FIG. 4, seat 24 comprises rear portion 71, front portion 73, and opposite side edges 72. In one aspect, seat 24 has a width (W2) extending between side edges 72 that generally corresponds with a width (W1) of slot 45 of backrest 26 (FIG. 3) to enable slidable movement of seat 24 within and through slot 45 of back rest 26. In one aspect, a pair of ears 42 extends outward, respectively, in opposite directions from each side edge 72. In another aspect, each side edge 72 includes a contact portion 70 (having a width W3) sized and shaped for contact with contact portion 47 of back rest 26, as further illustrated in FIGS. 2 and 5-6.

In one embodiment, seat 24 also comprises pivot mechanism 40A, 40B adjacent rear portion 71 on opposite sides of seat 24. In one aspect, each pivot mechanism 40A, 40B is configured for pivotally mounting body 75 of seat 24 relative to gate 22 and is configured for pivotal mounting of flap 77 relative to body 75 of seat 24 and relative to gate 22. In another aspect, pivot mechanism 40A of seat 24 comprises sleeve 80A of seat body 75, sleeve 82A of seat flap 77, and pin 85A while pivot mechanism 40B of seat 24 comprises sleeve 80B of seat body 75, sleeve 82B of seat flap 77, and pin 85B, each of which is further illustrated in association with FIG. 7. In one aspect, pivot mechanism 40A, 40B also further comprises sleeve array 100 of gate 22, as later described in association with FIGS. 7A and 7B.

Figure 5:
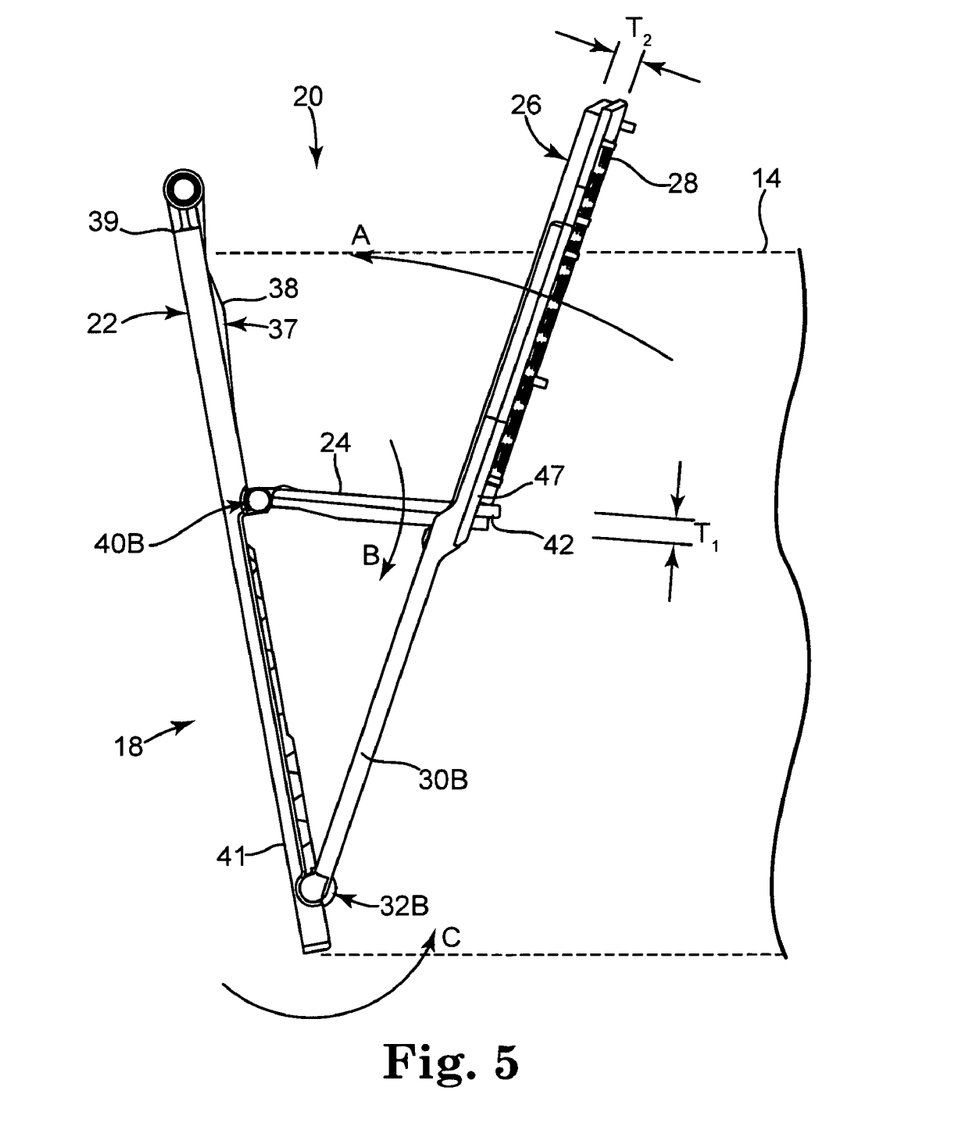
FIG. 5 is a side view of the gate-and-seat assembly in a first in-use position, according to an embodiment of the invention.

FIG. 5 is a side view of gate-and-seat assembly 20, according to one embodiment of the invention. As shown in FIG. 5, gate-and-seat assembly 20 is shown in a seating position in which seat 24 extends from gate 22 in a generally horizontal orientation for supporting a child or other items on seat 24. In this position, gravitational forces act to pull backrest 26 pivotally away from rear portion 18 of basket of cart (represented by dashed lines 14) while ears 42 of seat 24 in contact with rear contact portion 47 of backrest 26 prevent any further pivotal movement of back rest 26. At the same time, bar 64 of backrest 26 vertically supports seat 24 to receive a load, such as a seated child, while bar 64 of backrest 26 also facilitates secure engagement of ears 42 of seat 24 relative to rear contact portion 47 of back rest 26. In another aspect, directional arrow C in FIG. 5 represents pivotal movement of gate 22 upward within basket 14 during nesting of the shopping cart 10.

Figure 6:
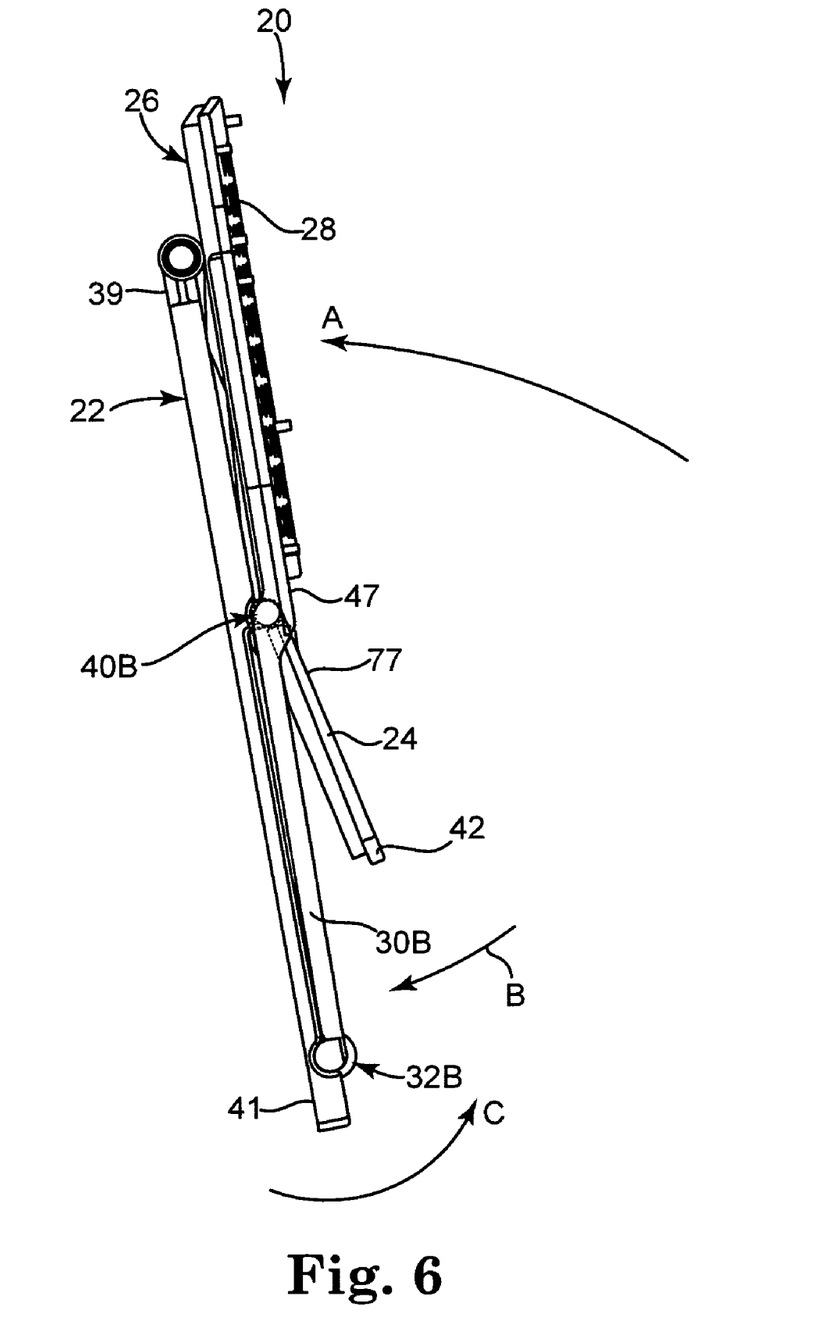
FIG. 6 is a side view of the gate-and-seat assembly during pivotal movement, according to an embodiment of the invention.

In one aspect, gate-and-seat assembly 20 is movable from its open, seating position (shown in FIG. 5) into a collapsed position in which backrest 26 and seat 24 are collapsed against gate 22 (as generally shown in FIG. 6). During this collapsing maneuver, backrest 26 moves along a first path indicated by directional arrow A and seat 24 moves along a second path indicated by directional arrow B and generally opposite path A.

As shown in FIG. 6, during this collapsing action, backrest 26 pivots generally horizontally toward and against upper portion 39 of gate 22 while seat 24 slides through slot 45 of backrest 26 before dropping down to pivot toward and against lower portion 41 of gate 22. FIG. 6 illustrates this "drop-down" collapsing action just before seat 24 is completely resting against lower portion 41 of gate 22. In one aspect, upon application of hand pressure to move backrest 26 toward gate 22, the pressure and contact of ears 42 of seat 24 (relative to rear contact portion 47 of backrest 26) is relieved as backrest 26 moves closer to gate 22 and seat 24 slides through slot 45 of backrest 26. As shown further in FIG. 6, after backrest 26 is substantially collapsed against upper portion 39 of gate 22 and a majority of seat 24 having slidably extended through slot 45 of backrest, the force of gravity pulls seat 24 pivotally downward (relative to pivot mechanism 40A, 40B) until seat 24 ultimately comes to rest generally against lower portion 41 of gate 22. In one aspect, seat 24 rests against lower portion 41 of gate 22 in a position generally between legs 30A and 30B of backrest 26. In one aspect, slot 45 of back rest 26 enables the entire seat 24 to slidably move through back rest 26, without any looped-interconnection of the seat 24 relative to the back rest 26 as occurs in conventional metal seat assemblies. Accordingly, embodiments of the invention greatly simplify manufacture and assembly of gate-and-seat assembly 20.

In one aspect, this "drop-down" collapsing action of gate-and-seat assembly 20 results in a generally lower, overall thickness of the collapsed gate-and-seat assembly than a conventional arrangement in which a seat would be pivoted upward toward an upper portion of a gate while a back rest was pivotally moved toward the same upper portion of the gate. This conventional arrangement results in the back rest and the seat stacked on top of each other while resting against the gate.

Moreover, an all plastic seat 24 of gate-and-seat assembly 20 has a thickness (T1 as shown in FIG. 5) substantially greater (at least twice as thick) than a conventional metal seat and an all-plastic back support 28 of gate-and-seat assembly 20 has a thickness (T2 as shown in FIG. 5) that is substantially greater (at least twice as thick) than a conventional metal back support. Accordingly, placing such all-plastic seat and an all-plastic backrest components in a conventional "pivot-up" collapsing arrangement would result in a combined thickness of seat 24 and backrest 26 of gate-and-seat assembly 20 that would substantially inhibit nesting of multiple, similarly-equipped shopping carts. In particular, if several of these conventionally arranged carts were nested together, each subsequent nested cart would have less clearance of a basket to nest within the prior nested cart. At some point, a limit would be reached in which no more nesting would be feasible. However, a conventional "pivot-up" collapsible seat for a metal construction seat assembly does not hinder nesting of multiple shopping carts because of the relatively thin seat and relatively thin back support.

On the other hand, embodiments of the invention of a "drop-down" collapsing seat 24 in which the seat 24 pivots downward relative to backrest 26, back support 28 and seat 24 occupy substantially less space. Accordingly, the "drop-down" collapsible arrangement of gate-and-seat assembly 20 facilitates generally unlimited nesting of shopping carts.

Figure 7A:
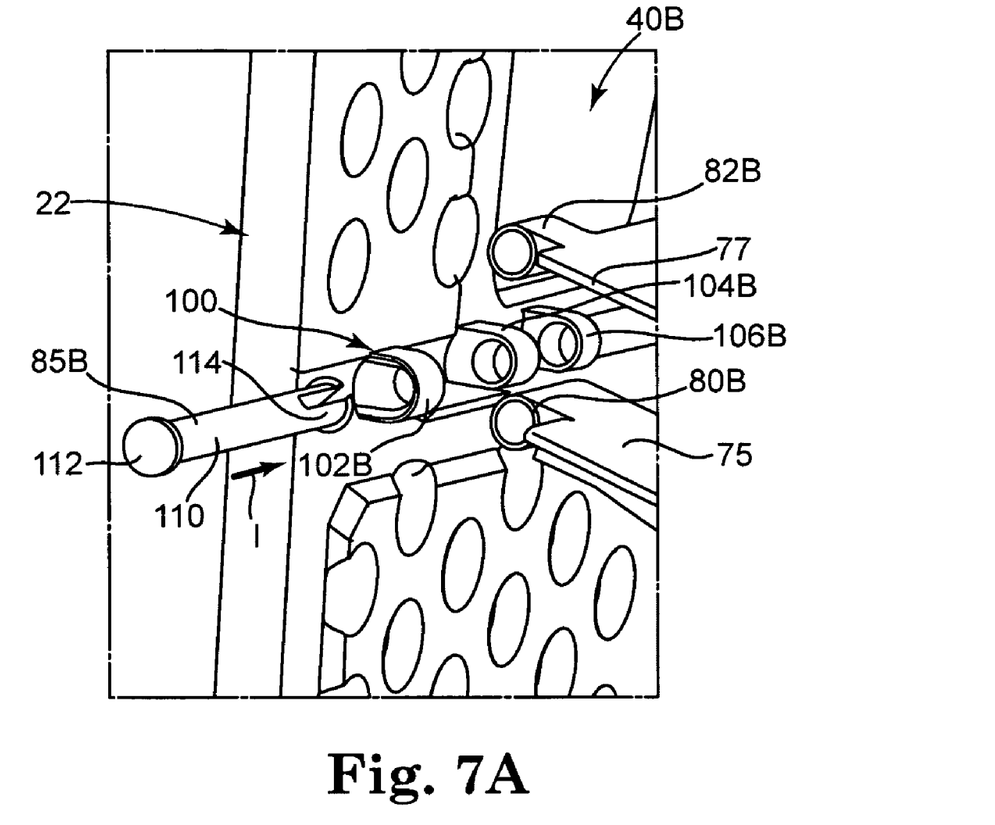
FIG. 7A is an enlarged perspective view of a pivot mechanism of the gate-and-seat assembly, according to an embodiment of the invention.

FIG. 7A is an isometric view of a pivot mechanism 40B of gate-and-seat assembly 20, according to an embodiment of the invention. As shown in FIG. 7A, pivot mechanism 40B comprises sleeve 80B of seat body 75, sleeve 82B of seat flap 77, and pin 85B, as previously described and illustrated in association with FIGS. 2-4. In addition, pivot mechanism 40B comprises sleeve array 100 including sleeve 102B, 104B, and 106B of gate 22. Sleeves 102B, 104B, and 106B of sleeve array 100 are spaced from each other to enable removable insertion and interleaving engagement of sleeves 80B and 82B of seat relative to the respective sleeves 102B-106B of sleeve array 100. In this interleaved position, sleeves 80B and 82B of seat 24 and sleeve array 100 of gate 22 are sized and shaped respectively to slidably receive pin 85B to maintain the interleaved position of sleeves 80B, 82B of seat 24 relative to the sleeves 102B-106B of sleeve array 100 of gate 22.

Figure 7B:
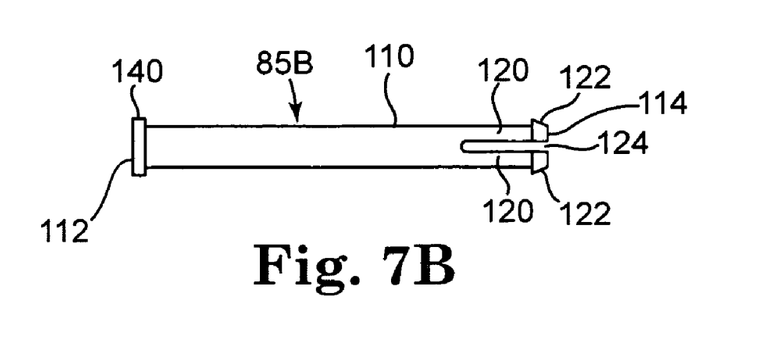
FIG. 7B is a plan view of a pin of a pivot mechanism of the gate-and-seat assembly, according to an embodiment of the invention.

FIG. 7B is a plan view of pin 85B, according to one embodiment of the invention. As further illustrated in FIG. 7B, pin 85B comprises shaft 110, cap end 112, and insert end 114. In one aspect, insert end 114 comprises a pair of fingers 120, flange 122 and slot 124 defined between fingers 120. In one aspect, each finger 120 comprises a flexible, resilient member with flange 122 extending circumferentially about fingers 120. In one aspect, flange 122 has a diameter generally greater than a diameter of shaft 110 adjacent insert end 114. In another aspect, cap end 112 includes a flange 140 having a diameter greater than the diameter of shaft 110 adjacent cap end 112.

As shown in FIG. 7A, pin 85B is slidably inserted (as indicated by directional arrow I) into sleeve 102B of sleeve array 100 of gate 22 and advanced through sleeves 80B of seat body 75, sleeve 104B of sleeve array 100 of gate 22, sleeve 82B of seat flap 77, and sleeve 106B of sleeve array 100 of gate 22. During this slidable insertion of pin 85B, fingers 120 are first pinched together and then maintained in a partially collapsed position relative to each other until flange 122 adjacent insert end 114 passes beyond sleeve 106B of sleeve array 100 of gate 22, whereupon fingers 120 return to their original position relative to each other. Accordingly, flange 122 of pin 85B becomes positioned to engage sleeve 106B, thereby preventing slidable movement of pin 85B out of sleeves 80B, 82B, and 102B-106B. Moreover, flange 140 of cap end 112 of pin 85B is sized and shaped to releasably engage sleeve 102B when pin 85B is fully inserted into sleeves 80B, 82B, and 102B-106B, thereby further preventing sliding movement of pin 85B along the respective sleeves. Finally, in another aspect, pin 85B has a length generally corresponding to a combined length of sleeves 80B, 82B, and 102B-106B when assembled in their interleaved, assembled configuration to generally limit lateral sliding movement of pin 85B in the final assembled state of pivot mechanism 40B. In this aspect, pin 85B has a length substantially less than a full length of rear portion 71 of seat 24 (FIG. 4) to further reduce the bulk of gate-and-seat assembly 20 and therefore reduce the bulk of cart 10 (FIG. 1), while also providing a low-profile that results in a more elegant appearing cart.

Accordingly, in combination with sleeves 104B, 106B of gate 22 and sleeve 82B of seat flap 77, pin 85B enables pivotal movement of seat flap 77 relative to seat body 75 and relative to gate 22. In addition, in combination with sleeves 102B, 104B of gate 22 and sleeve 80B of seat body 75, pin 85B enables pivotal movement of seat body 75 or entire seat 24 (seat body 75 and seat flap 77) relative to gate 22. With seat 24 generally constrained for slidable movement within slot 45 of back rest 26 (shown in FIGS. 2 and 4), pivot mechanism 40B enables downward pivotal movement of seat 24 relative to gate 22 during collapsing of seat assembly 20 relative to gate 22 and enables upward pivotal movement of seat 24 relative to gate 22 during opening of seat assembly 20 relative to gate 22.

Accordingly, pivot mechanism 40B, including pin 85B, enables an all-plastic and low-profile, sturdy construction that is easy to assembly.

In one aspect, pivot mechanism 40A comprises substantially the same features and attributes as described and illustrated for pivot mechanism 40B, except being located on an opposite side of seat 24 and having like components with like reference numerals except carrying the A designation.

Figure 8:
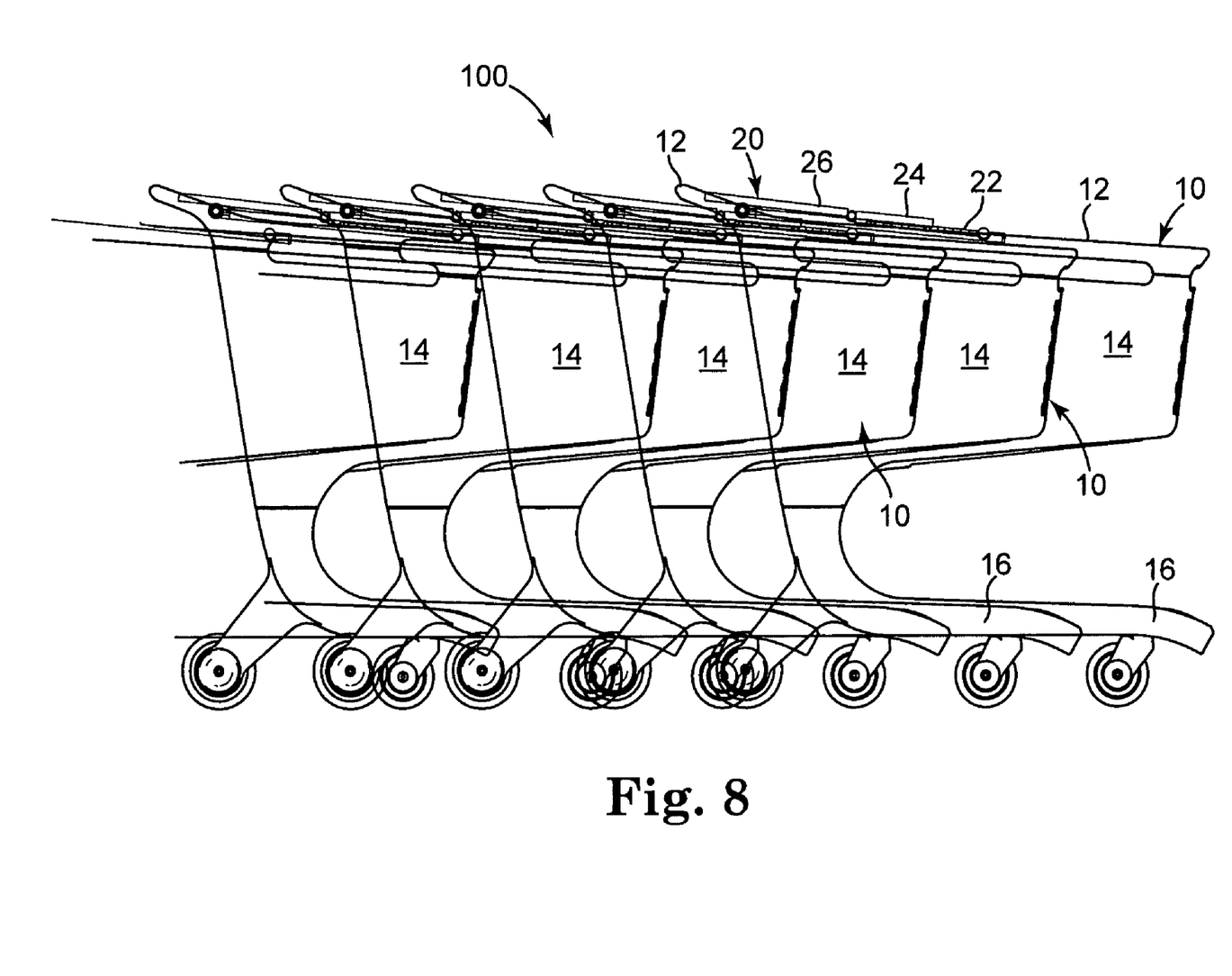
FIG. 8 is a schematic illustration of nesting of multiple shopping carts, according to an embodiment of the invention.

FIG. 8 is a side view schematically illustrating a method 100 of nesting of multiple shopping carts 10, according to an embodiment of the invention. As shown in FIG. 8, method 100 comprises nesting carts 10 relative to each with a gate-and-seat assembly 20 of a first shopping cart 10 pivoted upward to enable a basket 14 of a second shopping cart to nest within the basket 14 of the first shopping cart 10, and so on for subsequently nested shopping carts. In one aspect, this nesting is facilitated by a gate-and-seat assembly 20 as previously described in association with FIGS. 1-7 in which the gate-and-seat assembly 20 has a "drop-down" collapsing action of its seat to minimize the overall thickness of the gate-and-seat assembly 20 during nesting of shopping carts 10. As shown in FIG. 8, this space saving, "drop-down" gate-and-seat assembly 20 includes a collapsed gate 22 in which backrest 26 and seat 24 are arranged side-by-side instead of in stacked relationship, as occurs in conventional seat assemblies of shopping carts. Accordingly, embodiments of the invention enable an all-plastic construction of a shopping cart, including a sturdy all-plastic gate-and-seat assembly, without relinquishing significant functions of shopping carts such as nesting.

Embodiments of the invention enable convenient and efficient conversion of a gate-and-seat assembly between an open, seating position and a collapsed position via a backrest and seat arranged in a drop-down pivoting relationship, among other features. This arrangement enables effective nesting of shopping carts having generally thicker, all-plastic seat assemblies by reducing the overall thickness of the gate and seat assembly in its collapsed state.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A gate-and-seat assembly for a shopping cart comprising:
   a gate having a first end pivotally mountable adjacent to a rear portion of a shopping cart;
   a backrest including:
      a back support defining a slot; and
      a pair of legs extending from the back support and pivotally mounted to a lower portion of the gate to enable pivotal movement of the backrest relative to the gate; and
   a seat pivotally mounted to the gate via at least one pivot mechanism and slidably extendable through the slot of the back support, the seat including a pair of ears extending laterally outward from the seat in opposite directions with each respective ear being releasably engageable relative to a rear contact portion of the back support of the backrest,
   wherein the entire gate-and-seat assembly is made from a plastic material, and
   wherein the seat is pivotally movable from a seating position to a collapsed position upon pivotal movement of the backrest in a first rotational direction toward the gate with the seat slidably moving through the slot of the back support and pivoting in a second rotational direction downward toward the gate until both the seat and the back support are collapsed against the gate, wherein the first rotational direction and the second rotational direction are generally opposite one another.

2. The gate-and-seat assembly of claim 1 wherein the seat is pivotally movable from the collapsed position to the seating position upon pivotal movement of the backrest away from the gate with the seat slidably moving through the slot of the back support and pivoting upward away from the gate until the seat is in a generally horizontal orientation with the ears of the seat in releasable contact against the rear contact portion of the back support to maintain, in combination with gravitational forces, the seat in the seating position.

3. The gate-and-seat assembly of claim 1 wherein the seat includes a pair of side edges with each respective ear extending outward from the respective side edges of the seat, and the legs of the backrest laterally spaced from each other by a width generally corresponding to a width of the seat between the side edges of the seat.

4. The gate-and-seat assembly of claim 1 wherein the at least one pivot mechanism comprises a first sleeve array of the gate, at least one sleeve of the seat, and a pin extending through the first sleeve array of the gate and the at least one sleeve of the seat to maintain the first sleeve array of the gate and the at least one sleeve of the seat in an interleaved configuration.

5. The gate-and-seat assembly of claim 4 wherein the pin is made of a plastic material and comprises a shaft extending between a first end and a second end with the first end defining a flange and the second end defining a pair of flexible, resilient fingers separated by a slot and defining a beveled flange that extends circumferentially about the fingers.

6. The gate-and-seat assembly of claim 4 wherein the pin has a length that generally corresponds to a combined length of the sleeve array of the gate and the at least one sleeve of the seat.

7. The gate-and-seat assembly of claim 1 wherein the gate comprises a pair of leg openings located vertically above a location of the at least one pivot mechanism and a divider extending vertically between the leg openings, the divider including an angled portion configured to protrude away from an upper portion of the gate.

8. An all-plastic shopping cart comprising:
   a basket;
   a wheeled base supporting the basket;
   a handle spaced from and supported by the basket; and
   a gate-and-seat assembly including:
      a gate having an upper portion and a first end pivotally mountable adjacent to a rear portion of the shopping cart;
   a backrest including:
      a back support defining a slot; and
      a pair of legs extending from the back support and pivotally mounted to a lower portion of the gate to enable pivotal movement of the backrest relative to the gate; and
   a seat pivotally mounted to the gate via at least one pivot mechanism and slidably extendable through the slot of the back support, the seat including a pair of ears extending laterally outward from the seat in opposite directions with each respective ear being releasably engageable relative to a rear contact portion of the back support of the backrest, wherein the entire gate-and-seat assembly is made from a plastic material, and wherein the seat is pivotally movable from a seating position to a collapsed position upon pivotal movement of the backrest toward the gate with the seat slidably moving through the slot of the back support and pivoting downward toward the gate until both the seat and the back support are collapsed against the gate, the back support being collapsed against the upper portion of the gate.

9. The shopping cart of claim 8 wherein the seat is pivotally movable from the collapsed position to the seating position upon pivotal movement of the backrest away from the gate with the seat slidably moving through the slot of the back support and pivoting upward away from the gate until the seat is in a generally horizontal orientation with the ears of the seat in releasable contact against the rear contact portion of the back support to maintain, in combination with gravitational forces, the seat in the seating position.

10. The shopping cart of claim 9 wherein the seat includes a pair of side edges with each respective ear extending outward from the respective side edges of the seat, and the legs of the backrest laterally spaced from each other by a width generally corresponding to a width of the seat between the side edges of the seat.

11. The shopping cart of claim 9 wherein the at least one pivot mechanism comprises a first sleeve array of the gate, at least one sleeve of the seat, and a pin extending through the first sleeve array of the gate and the at least one sleeve of the seat to maintain the first sleeve array of the gate and the at least one sleeve of the seat in an interleaved configuration.

12. The shopping cart of claim 9 wherein the gate comprises a pair of leg openings located vertically above a location of the at least one pivot mechanism and a divider extending vertically between the leg openings, the divider including an angled portion configured to protrude away from an upper portion of the gate.

13. The shopping cart of claim 12 wherein the seat includes a concave depression in a top surface of the seat with the concave depression sized and shaped to generally mate relative to the divider of the gate.

14. A method of nesting an all-plastic shopping cart comprising:

providing a first shopping cart including a rear gate pivotally movable upward through a basket of the first shopping cart into a nestable position for nestably receiving a second shopping cart within the basket of the first shopping cart;

arranging a gate-and-seat assembly of the first shopping cart for pivotal movement between an open, seating position in which a seat is in a generally horizontal position and a collapsed, storage position in which a back support is pivoted in a first direction with respect to a gate to rest against the gate and the seat is pivoted in a second direction with respect to the gate that is generally opposite to the first direction to rest against the gate in a position vertically below the back support; and forcibly nesting the second shopping cart into the first shopping cart with the gate-and-seat assembly in the collapsed, storage position.

15. The method of claim 14 wherein arranging the gate-and-seat assembly comprises:

arranging the back support to include a slot extending laterally across the back support and having a width generally corresponding to a width of the seat.

16. The method of claim 15 and further comprising:

removing the second shopping cart from a nested relationship with the first shopping cart to enable the gate-and-seat assembly of the first shopping cart to pivot downward into a generally vertical position and to pivotally move the back support of the gate-and-seat assembly away from the gate to cause the seat to slidably move through the slot of the back support and into the seating position in which the seat is supported by and within the slot of the back support and in which releasable engagement between a rear portion of the back support and at least one ear of the seat prevents further pivotal movement of the back support away from the gate.

17. The method of claim 16 wherein arranging the back support comprises:

arranging a pair of legs that extend downwardly and outwardly from the back support, with each respective leg being pivotally mounted adjacent and relative to a lower portion of the gate and the legs being laterally spaced apart from each other by a width that generally corresponds to a width of the seat.

* * * * *

UNITED STATES PATENT AND TRADEMARK OFFICE
CERTIFICATE OF CORRECTION

PATENT NO. : 7,766,347 B2 Page 1 of 1
APPLICATION NO. : 11/595037
DATED : August 3, 2010
INVENTOR(S) : Mark T. Ryan and Robert D. Peota It is certified that error appears in the above-identified patent and that said Letters Patent is hereby corrected as shown below:

On the Title Page Item (73) Assignee delete "Traget" and add --Target--.

Signed and Sealed this

Fourteenth Day of December, 2010

David J. Kappos
*Director of the United States Patent and Trademark Office*